United States Patent [19]

Nishimura et al.

[11] Patent Number: 5,021,952
[45] Date of Patent: Jun. 4, 1991

[54] ELECTRONIC ACCOUNT RECORDING DEVICE

[75] Inventors: Toshio Nishimura, Joyo; Akitaka Morita, Nara, both of Japan

[73] Assignee: Sharp Kabushiki Kaisha, Osaka, Japan

[21] Appl. No.: 353,173

[22] Filed: May 15, 1989

Related U.S. Application Data

[63] Continuation of Ser. No. 29,766, Mar. 24, 1987, abandoned.

[30] Foreign Application Priority Data

Mar. 24, 1986 [JP] Japan ................................. 61-68129

[51] Int. Cl.⁵ .......................................... G06F 15/30
[52] U.S. Cl. ................................ 364/406; 364/709.04
[58] Field of Search ............. 364/406, 709.01, 709.03, 364/709.04, 709.16, 710.04, 710.09

[56] References Cited

U.S. PATENT DOCUMENTS

| | | | |
|---|---|---|---|
| 4,090,247 | 5/1978 | Martin | 364/710.09 |
| 4,117,542 | 9/1978 | Klausner et al. | 364/900 |
| 4,192,006 | 3/1980 | Hausdorff | 364/715 |
| 4,528,638 | 7/1985 | Hatta et al. | 364/709 |
| 4,530,068 | 7/1985 | Nakanishi et al. | 364/706 |
| 4,587,409 | 5/1986 | Nishimura et al. | 364/705 |
| 4,700,297 | 10/1982 | Hagel, Sr. et al. | 364/408 |

FOREIGN PATENT DOCUMENTS 0137460 10/1981 Japan ................................. 364/209.02

*Primary Examiner*—Jerry Smith
*Assistant Examiner*—Kim Thanh T. Bui

[57] ABSTRACT

An electronic account recording device according to the present invention has number keys for effecting the input of a number, a switch key for selecting an item from a plurality of items, an amount key for recording an expense amount as inputted by the number keys, and a scan keys for calling back sequentially the expense amounts recorded by the number keys and the amount key. The device further has a display for displaying an item name and an expense amount during the input as effected by the number keys and the amount key, and also during the call back as effected by the scan key, and a memory for storing the item name and the expense amount in pairs sequentially in the input order. A controller is provided which operates in response to an actuation of the scan key, to call back the expense amounts chained by the item name. Thus, the expense amounts of one item are sequentially called back and displayed through the display one at a time and, thereafter, the expense amounts of another item are sequentially called back and displayed one at a time.

12 Claims, 22 Drawing Sheets

Fig. 6

| KEY OP | DISPLAY |
|---|---|
| MEMO | A:    [ ] |
| SW | b:    [ ] |
| SW | C:    [ ] |
| SW | d:    [ ] |
| SW | A:    [ ] |
| 1 | A:    1 |
| SW | 1:    [ ] |
| 2 | 1:    2. |
| SW | 2:    [ ] |
| SW | A:    [ ] |

Fig. 7

| KEY OP | DISPLAY |
|---|---|
| 1 [SW] | 1: [ ] |
| [V] | EXPNS<br>1: 200.<br>P1 P2 P3 P4 P5 P6 |
| [V] | EXPNS<br>1: 430.<br>☐☐☐☐☐☐ |
| [V] | EXPNS<br>1: 7'100.<br>☐☐☐☐☐☐ |
| ⋮ | |
| [V] | EXPNS<br>1: 580.<br>☐☐☐☐☐☐ |
| [V] | EXPNS TOTAL<br>1: 12'300. |
| [V] | EXPNS<br>2: 260.<br>☐☐☐☐☐☐ |
| [∧] | EXPNS<br>1: 580.<br>☐☐☐☐☐☐ |
| ⋮ | |
| [V] | EXPNS<br>2: 580.<br>☐☐ |
| ⋮ | |
| [V] | EXPNS TOTAL<br>2: 7'850. |
| [V] | EXPNS TOTAL<br>d: 20'150. |

Fig. 8a
| KEY OP | DISPLAY | |
|---|---|---|
| 25000 | A:    25'000. | BUDGET SETTING |
| BDGT | A:    BDGT 25'000. | |
| 5000 | A:    5'000. | BUDGET INCREASE |
| BDGT | A:    BDGT 30'000. | |
| 3000 ⊟ | A:    3'000. | BUDGET DECREASE |
| BDGT | A:    BDGT 27'000. | |
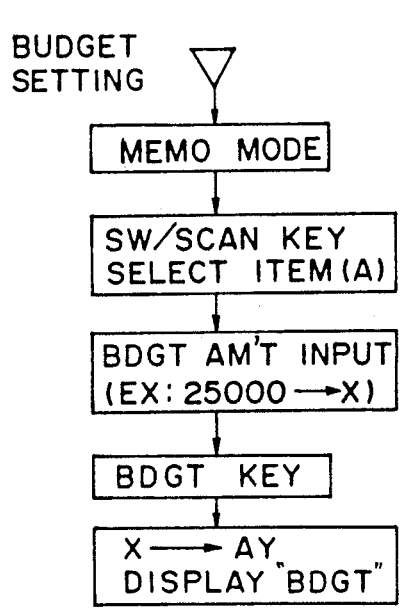
Fig. 8b
BUDGET SETTING
↓
MEMO MODE
↓
SW/SCAN KEY SELECT ITEM (A)
↓
BDGT AM'T INPUT (EX: 25000 → X)
↓
BDGT KEY
↓
X → AY
DISPLAY "BDGT"
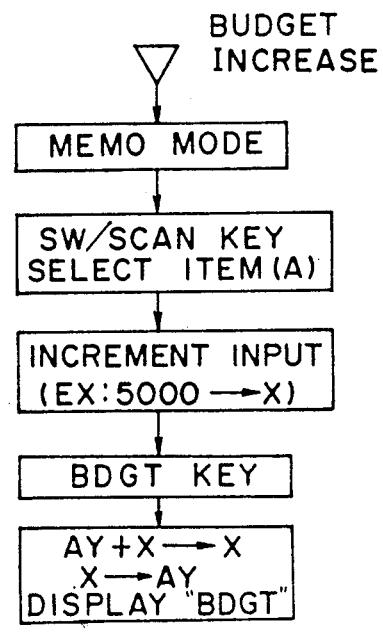
Fig. 8c
BUDGET INCREASE
↓
MEMO MODE
↓
SW/SCAN KEY SELECT ITEM (A)
↓
INCREMENT INPUT (EX: 5000 → X)
↓
BDGT KEY
↓
AY + X → X
X → AY
DISPLAY "BDGT"

| KEY OP | DISPLAY | |
|---|---|---|
| | A: BDGT 27'000. | ↑ |
| CRRCT | A: CRRCT BDGT 27'000. | BUDGET RENEWAL |
| 35000 | A: CRRCT 35'000. | |
| BDGT | A: BDGT 35'000. | ↓ |
| CRRCT | A: CRRCT BDGT 35'000. | ↑ BUDGET CLEAR |
| C | A: CRRCT 0. | |
| BDGT | A: BDGT 0. | ↓ |

Fig. 9a

| KEY OP | DISPLAY |
|---|---|
| SW | A: ( ) |
| PUPOS | A: ▼ |
| 500 | A: ▼ 500. |
| AM'T | A: ▼ EXPNS 500. <br> ↓ (1~2S) <br> A: EXPNS TOTAL 500. |
| PUPOS | A: ▼ 500. |
| 100 | A: ▼ 100. |
| A'MT | A: ▼ EXPNS 100. <br> ↓ (1~2S) <br> A: EXPNS TOTAL 600. |
| PUPOS | A: ▼ 600. |
| 20000 | A: ▼ 20'000. |
| AM'T | A: ▼ 20'000. <br> ↓ (1~2S) <br> A: ▼ EXPNS TOTAL 20'600. |
| BALNC | BALNC 600.- |

Fig. 9c

| KEY OP | DISPLAY |
|---|---|
| MEMO | A: [ ] |
| / SW | I: [ ] |
| PUPOS  PUPOS | I: |
| 200 | I:          200. |
| AM'T | I:   EXPNS 200.  (1~2S) |
|  | I:   EXPNS TOTAL 200. |
| PUPOS | I:          200. |
| 430 | I:          430. |
| AM'T | I:   EXPNS 430.  (1~2S) |
|  | I:   EXPNS TOTAL 630. |
| PUPOS 7100 AM'T | I:   EXPNS 7'100.  (1 2S) |
|  | I:   EXPNS TOTAL 7'730. |
| ∧ | I:   EXPNS 7'100. |

| KEY OP | DISPLAY |
|---|---|
| 350 [AM'T] | 3: EXPNS 350. |
| | ↓ (1~2S) |
| | 3: EXPNS TOTAL 9'800. |
| [∧] | 3: EXPNS 350. |
| [CRRCT] | 3: CRRT EXPNS 350. |
| 360 | 3: CRRCT 360. |
| [AM'T] | 3: EXPNS 360. |
| | ↓ (1~2S) |
| | 3: EXPNS TOTAL 9'810. |

Fig. 11

| KEY OP | DISPLAY |
|---|---|
| 2 [SW] | 2: [ ] |
| [V] | 2:  EXPNS 260. ▼ □ |
| [V] | 2:  EXPNS 580. ▼ □□ |
| [CRRCT] | 2: CRRCT EXPNS 580. ▼ □□ |
| [PUPOS] | 2: CRRCT  580. ▼ □□□ |
| [AM'T] | 2:  EXPNS 580. ▼ □□□  ↓(1~2S) |
|  | 2:  EXPNS TOTAL 840 |

Fig. 12a

| KEY OP | DISPLAY |
|---|---|
| 250 [AM'T] | 5:  EXPNS  250. |
| | ↓ (1~2S) |
| | 5:  EXPNS TOTAL  14500. |
| [∧] | 5:  EXPNS  1200. |
| ↓ | ↓ (1~2S) |
| [∧] | 5:  EXPNS  350. |
| [∨] | 5:  EXPNS  780. |
| [CRRCT] | 5:  EXPNS  780. |
| [BALNC] | 5:  EXPNS  1'130. |
| | ↓ (1~2S) |
| | 5:  EXPNS TOTAL  14'500. |

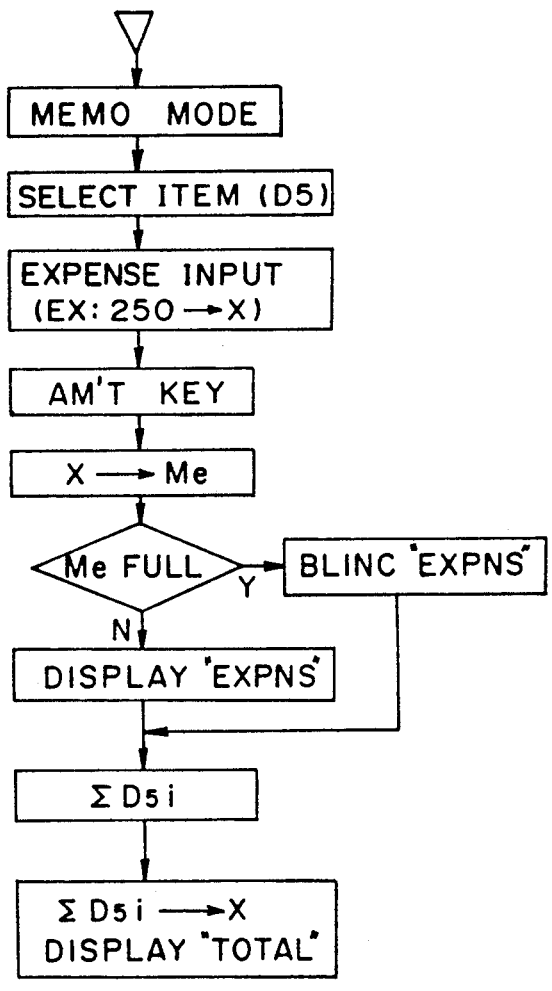
Fig. 12b
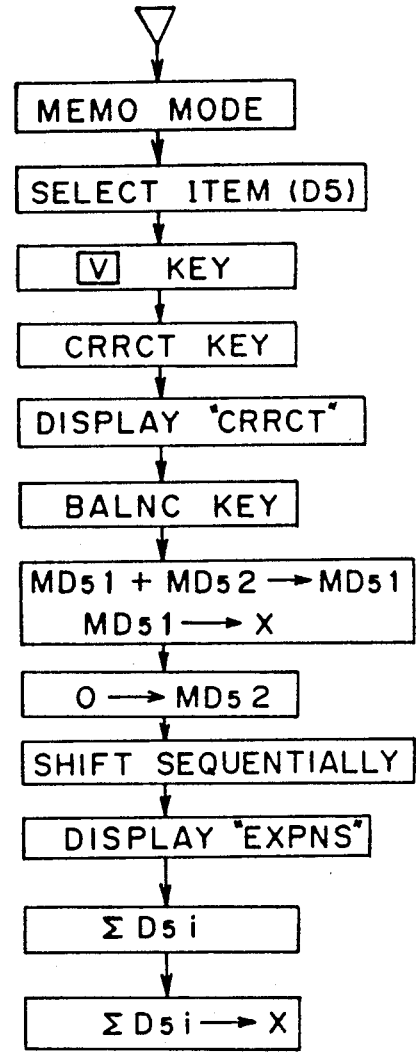
Fig. 12c
Fig. 12d
| N-7 | D5 | (P3) | 350 (D51) |
|-----|----|------|-----------|
| N-6 | A  | (P2) | 500 (A7)  |
| N-5 | B  | (P1) | 300 (B4)  |
| N-4 | D5 | (P1) | 780 (D52) |
| N-3 | A  | (P2) | 1300 (A8) |
| N-2 | A  | (P1) | 650 (A9)  |
| N-1 | D5 | (P3) | 1200 (D53)|
| N   | D5 | (P4) | 250 (D54) |
| N-7 | D5 |      | 1130 (D51) |
|-----|----|------|------------|
| N-6 | A  | (P2) | 500 (A7)   |
| N-5 | B  | (P1) | 300 (B4)   |
| N-4 | A  | (P2) | 1300 (A8)  |
| N-3 | A  | (P1) | 650 (A9)   |
| N-2 | D5 | (P3) | 1200 (D52) |
| N-1 | D5 | (P4) | 250 (D53)  |
| N   |    |      |            |

Fig. 14

| KEY OP | DISPLAY |
|---|---|
| 5 [SW] | 5:　　　[　] |
| [V] | 5:　EXPNS<br>　　1130. |
| [V] | 5:　EXPNS<br>　　560. |
| [CRRCT] | 5: CRRCT　EXPNS<br>　　560. |
| [C] | 5: CRRCT<br>　　0. |
| [AM'T] | 5:　EXPNS<br>　　0. |
| ↓ (1~2S) | 5: EXPNS TOTAL<br>　　1130. |

Fig. 15a

| KEY OP | DISPLAY |
|---|---|
| SW | A: ( ) |
| PUPOS | A: ▾ |
| 500 | A: ▾ 500 |
| AM'T | A: ▾ EXPNS 500 |
|  | A: 99999400 EXPNS TOTAL |
| 700 | A: EXPNS 700 |
|  | A: 1.0000010 E  EXPNS TOTAL |
| C | A: ( ) |

Fig. 16

| KEY OP | DISPLAY |
|---|---|
| 2 | 1:  2. |
| SW | 2:  [  ] |
| PUPOS | 2: ▼<br>□ |
| 130 X 2 AM'T | EXPNS<br>2:  260.<br>▼<br>□  ↓ (1~2S)<br>EXPNS TOTAL<br>2:  260. |
| PUPOS PUPOS 580 AM'T | EXPNS<br>2:  580.<br>▼<br>□ □  ↓ (1~2S)<br>EXPNS TOTAL<br>2:  840. |

ELECTRONIC ACCOUNT RECORDING DEVICE

This application is a continuation, of application Ser. No. 07/029,766 filed on Mar. 24, 1987, now abandoned.

BACKGROUND OF THE INVENTION

1. Field of the Invention

The present invention relates to an electronic memory device and, more particularly, to a pocket size electronic account record keeping device for keeping budget and expense accounts.

2. Description of the Prior Art

Conventionally, a number of electronic devices have been proposed, such as an accounting device for home use, which can keep the budget and expense accounts. But due to their compact size, the conventional devices have a problem in that the storage capacity for each item is restricted. Therefore, once the storage capacity for one item is filled, the device will not accept any additional input of accounts for the same item, making it difficult to store further accounts.

SUMMARY OF THE INVENTION

The present invention has been developed with a view to substantially solve the above described problem and for its essential object provides an improved electronic account recording device which can arbitrarily change the storage capacity of each item.

It is a further object of the present invention to provide an improved electronic account recording device which can scan through the recorded accounts of each item in an input order and also in the opposite order to the input order.

It is another object of the present invention to provide an improved electronic account recording device which can add up a plurality of accounts, when the storage capacity is filled, and store the added result as one account so as to save memory area for the further account inputs.

It is a still further object of the present invention to provide an improved electronic account recording device which can calculate and display the balance and, at the same time, can inform the user of an over budget by a warning of flashing a balance sign together with red figures.

It is yet another object of the present invention to provide an improved electronic account recording device which can sequentially jump from one item to the next item in response to the depression of a switch key.

It is a further object of the present invention to provide an improved electronic account recording device which can produce a warning, when the number of memory segments used for storing expenses exceeds a predetermined number, by flashing an expense sign and, at the same time, prohibit further data input.

It is another object of the present invention to provide an improved electronic account recording device which can produce an estimated total amount of the expenses even when the sum of the accounts in an item overflows.

In accomplishing these and other objects, an improved electronic account recording device according to the present invention comprises number keys for effecting the input of a number, a switch key for selecting an item from a plurality of items, an amount key for recording an expense amount that is inputted by the number keys, and a scan keys for calling back sequentially the expense amounts recorded by the number keys and the amount key. The device further has a display for displaying an item name and an expense amount during the input as effected by the number keys and the amount key. Also, during the call back as effected by the scan key, a memory stores the item name and the expense amount in pairs sequentially in the input order. A controller is provided which operates in response to an actuation of the scan key, to call back the expense amounts chained by the item name. Thus, the expense amounts of one item are sequentially called back and displayed through the display one at a time and, thereafter, the expense amounts of another item are sequentially called back and displayed one at a time.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 1b is a fragmentary view showing a detail of the portion of a device shown in FIG. 1a;

FIG. 6 is a diagram showing the display in response to the key operation of the SW key;

FIG. 7 is a diagram showing the display in response to the key operation of the SCAN key;

FIG. 8a is a diagram showing the key operation and the display for inputting the budget data;

FIGS. 8b, 8c and 8d are flow charts showing operations for setting, for increasing and for decreasing the budget, respectively;

FIG. 8e is a diagram showing the key operation and the display for renewing and clearing the budget data;

FIG. 9a is a diagram showing the key operation and the display for inputting the expense data according to one example;

FIG. 9b is a flow chart showing the operation for the steps shown in FIG. 9a;

FIG. 9c is a diagram showing the key operation and the display for inputting the expense data according to another example;

FIG. 10a is a diagrammatic view showing the key operation and the display for correcting the inputted expense data;

FIG. 10b is a flow chart showing the operation for the steps shown in FIG. 10a;

FIG. 11 is a diagram showing the key operation and the display for correcting a pointer position;

FIG. 12a is a diagram showing the key operation and the display for carrying out a compression operation;

FIG. 12b is a flow chart showing the operation when the expense memory area is filled;

FIG. 12c is a flow chart showing the operation for carrying out the compression operation;

FIG. 12d is a diagram showing the memory area in RAM2 before and after the compression operation;

FIG. 13a is a diagram showing the key operation and the display for carrying out a cancellation of all the expense data in one item;

FIG. 13b is a flow chart showing the operation for the steps shown in FIG. 13a;

FIG. 14 is a diagram showing the key operation and the display for carrying out a cancellation of one expense data;

FIG. 15a is a diagram showing the key operation and the display for effecting the estimated display when the overflow takes place during addition of the expenses;

FIG. 15b is a flow chart showing the operation for the steps shown in FIG. 15a; and FIG. 16 is a diagram showing the key operation and the display for effecting the calculation under the memory mode.

DESCRIPTION OF THE PREFERRED EMBODIMENTS

Figure 1A:
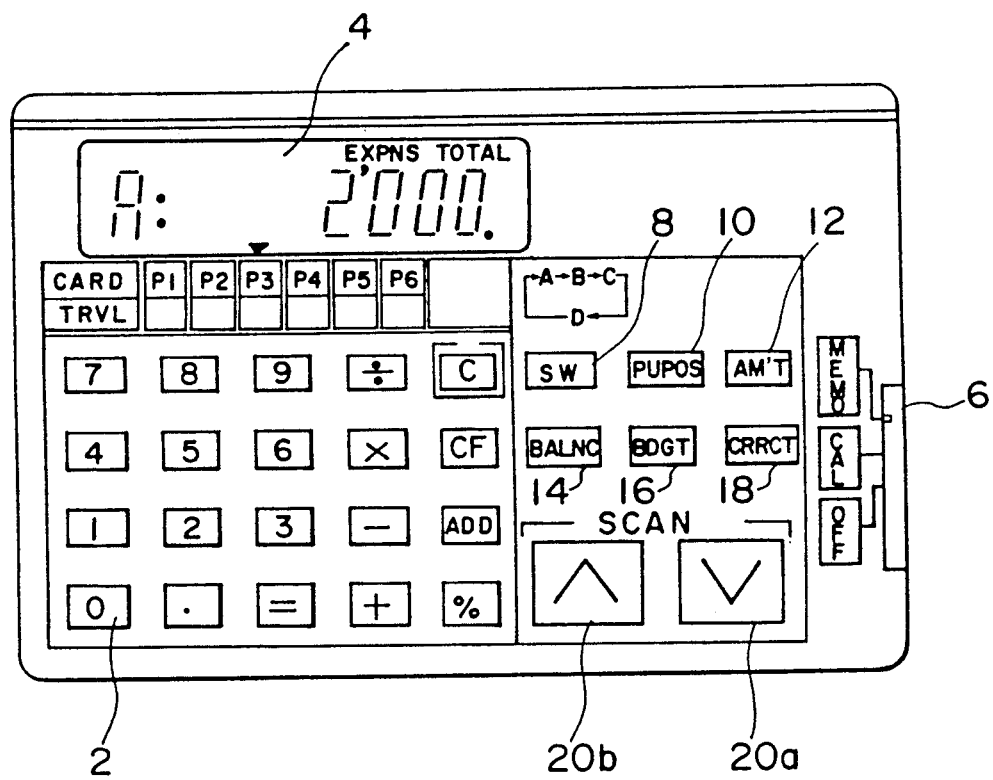
FIG. 1a is a plan view of an electronic account recording device according to the preferred embodiment.

Referring to FIG. 1a, a pocket size electronic account record keeping device for keeping budget and expense accounts according to the preferred embodiment is shown. The electronic account record keeping device has calculation functions for addition, subtraction, multiplication and division, and also a data storing function, as in an ordinary pocket size calculator.

The electronic account recording device of the preferred embodiment show in FIG. 1a is formed by a thin rectangular casing, and has number keys 2 for inputting numbers and various calculation functions, a liquid crystal display device 4 and a mode key 6, which is also used as a power switch, for selecting between a calculation mode and a memory mode.

The electronic account recording device further has keys for keeping accounts which are: a switch key 8 indicated as "SW" for selecting a budget item from a number of items A, B, C, and D; a purpose key 10 indicated as "PUPOS" for setting the purpose of the expense; an amount key 12 indicated as "AM'T" for effecting the input of an amount of an expense; a balance key 14 indicated as "BALNC" for taking a balance between the budget and the expenses; a budget key 16 indicated as "BDGT" for depositing the budget; a correction key 18 indicated as "CRRCT" for correcting the input amount; and SCAN keys 20a and 20b for effecting the down and up scanning through the stored data.

DISPLAY DEVICE

Display device 4 has an area for displaying a number, such as "2,000" shown in FIG. 1a. A maximum of an eight decimal place number can be displayed. The electronic account recording device of the embodiment herein disclosed is designed for the Japanese currency, yen, and therefore, has a decimal point placed at the right end of the number displayed. For a different currency, such as dollar, the decimal point may be shifted to a required place. The decimal point may be fixed at the required place during the manufacture of the device, or the decimal point may be made shiftable by a decimal point shift key (not shown) provided on the device.

Figure 5A:
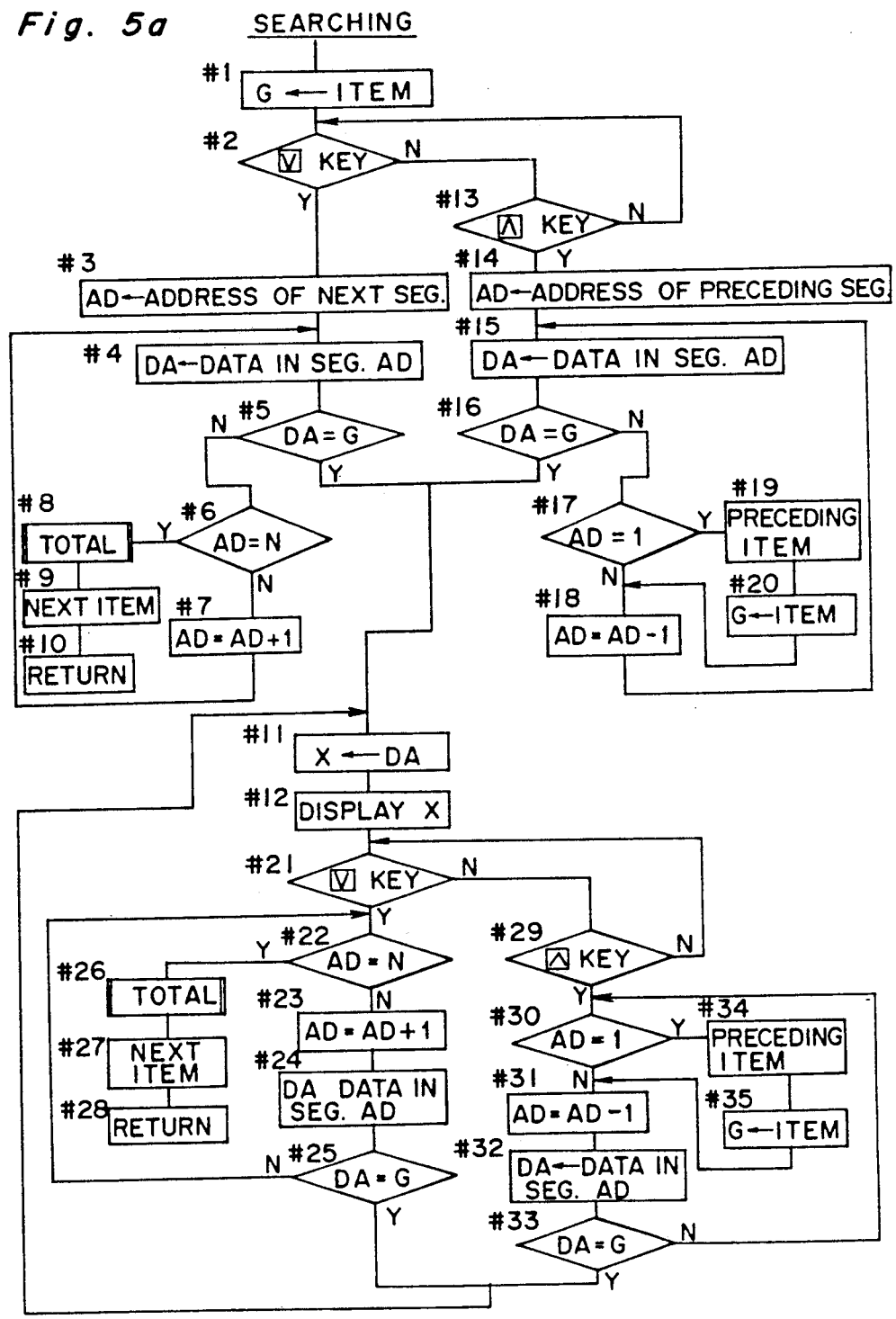
FIG. 5a is a flow chart showing the searching operation of searching the next segment to be displayed when the SCAN key is depressed.

Display device 4 further has at the left end thereof, an area for displaying the item name as selected by the SW key, which is either item A, item B, item C or item D. Because a seven segment display device is used, item B and item D are displayed as "b" and "d", respectively, such as shown in FIG. 5a. By the depression of the SW key repeatedly or continuously, the item name sequentially changes on the display as "A", "b", "C" and "d" in said order. Item D is defined by subitems 1, 2, 3, 4, 5, 6 and 7. The subitem can be accessed by designating the subitem number through the depression of the number key 2 and then the depression of the SW key. The subitem can be accessed from any position, such as from the item A displaying position.

Display device 4 has at the top thereof, an area for displaying guide marks. The guide marks are "CRRCT" indicating correction, "BDGT" indicating budget, "BALNC" indicating balance, "EXPNS" indicating expense and "TOTAL" indicating total. In FIG. 1a, the guide mark "EXPNS TOTAL" is shown meaning that the total of the expenses in item A is 2000 (yen).

Figure 1B:
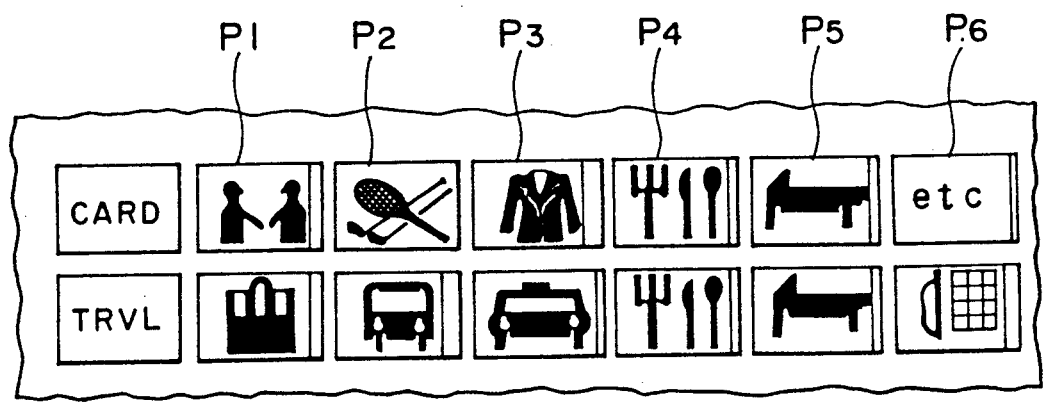

Display device 4 also has at the bottom thereof an area for displaying a pointer which points to one of the different marks P1, P2, P3, P4, P5 and P6 schematically illustrating the purposes of the expense. Such expense purposes include guest entertainment, hobby/sport, clothing, foods, hotels, and others. The marks P1-P6 may be provided in two rows, as shown in FIG. 1b, so that the top row marks may represent expenses effected by a credit card and the bottom row marks may represent expenses related to traveling. The pointer repeatedly moves from left to right step-by-step and then disappears upon depression of the PUPOS key.

KEYS

The keys for account keeping include an SW key 8, PUPOS key 10, AM'T key 12, BALNC key 14, BDGT key 16, CRRCT key 18 and SCAN keys 20a and 20b, each key is briefly described below.

SCAN keys 20a and 20b are provided for scrolling the recorded budget and recorded expense accounts on the display.

SW key 8 is provided for a quick access to a required item A, B, C or D, or to a subitem D1, D2, D3, D4, D5, D6 or D7.

PUPOS key 10 is provided for shifting the pointer to indicate the purpose of the expense. When recording the expense, the pointer position is also recorded.

AM'T key 12 is provided for effecting the recording of the expense amount which is inputed by the number keys 2.

BALNC key 14 is provided for showing the operator the amount that is left.

BDGT key 16 is provided of recording budgets for items A, B, C and D.

Finally, CRRCT key 18 is provided for correcting the recorded budget or expense.

CIRCUIT ARRANGEMENT

Figure 2:
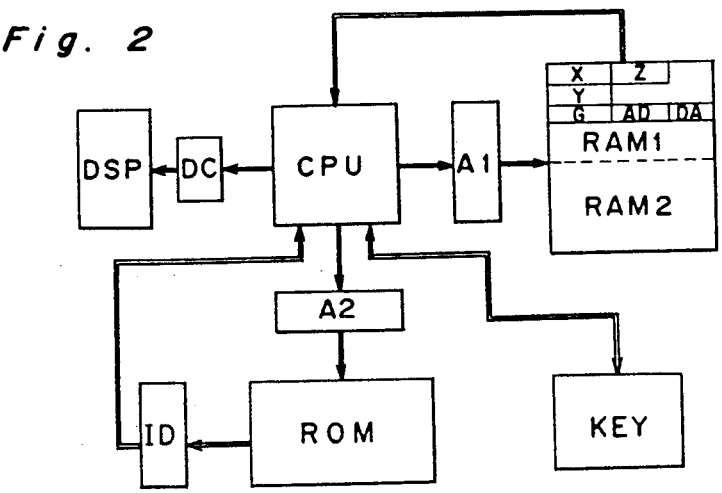
FIG. 2 is a block diagram of an electronic accounting device of the preferred embodiments.

Referring to FIG. 2, a circuit block diagram of the electronic account record keeping device is shown, which comprises a central processing unit CPU which receives input data from a key section KEY. A read only memory ROM is coupled with the CPU through an address counter A2 and has various programs stored for carrying out calculations. The programs stored in the ROM are applied through an instruction decoder ID to the CPU. A first random access memory RAM1 is provided as a register means for temporarily storing data for the calculation, and a second random access memory RAM2 is provided for recording the budget data and expense data. Random access memories RAM1 and RAM2 may be provided separately or as a single chip, and are coupled with the CPU through the address counter A1. The data stored in register X or RAM1 is transmitted through decoder DC to a display unit DSP for displaying the data in register X through display device 4.

Figure 3A:
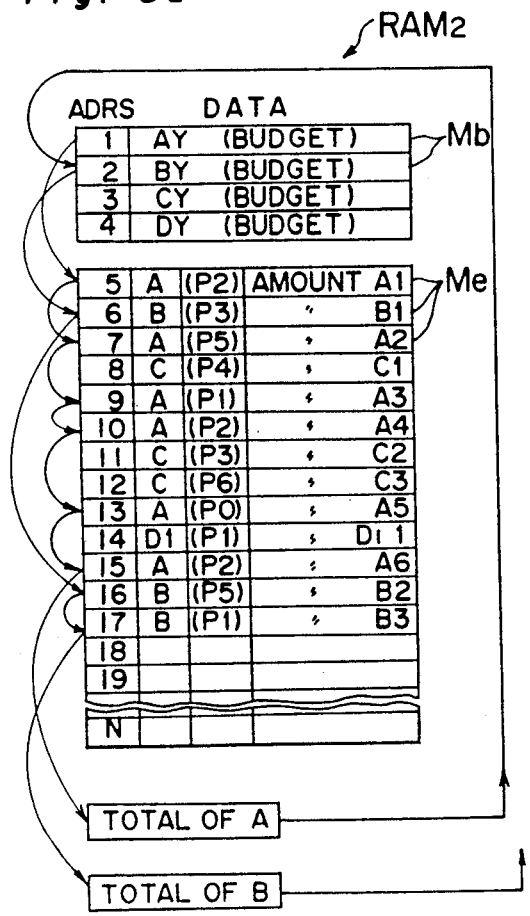
FIGS. 3a and 3b are schematic views showing the format for storing data.

Referring to FIG. 3a, the storing format of RAM2 is schematically shown. RAM2 comprises a plurality of storing segments Mb for storing item budgets and a plurality of storing segments Me for storing expenses, where each segment contains an address number. In the example shown in FIG. 3a, the expense storing segments start from address number 5. RAM2 is designed to store the expense amounts in the input order as shown in FIG. 3a. Each segment Me stores the data of: item name (A, B, C, D1, D2, D3, D4, D5, D6 or D7); purpose indication (P0, P1, P2, P3, P4, P5 or P6); and expense amount. The purpose indications P1-P6 correspond to the six pointer-positions, and the purpose indication P0 corresponds to the case when the pointer is not present.

Figure 4:
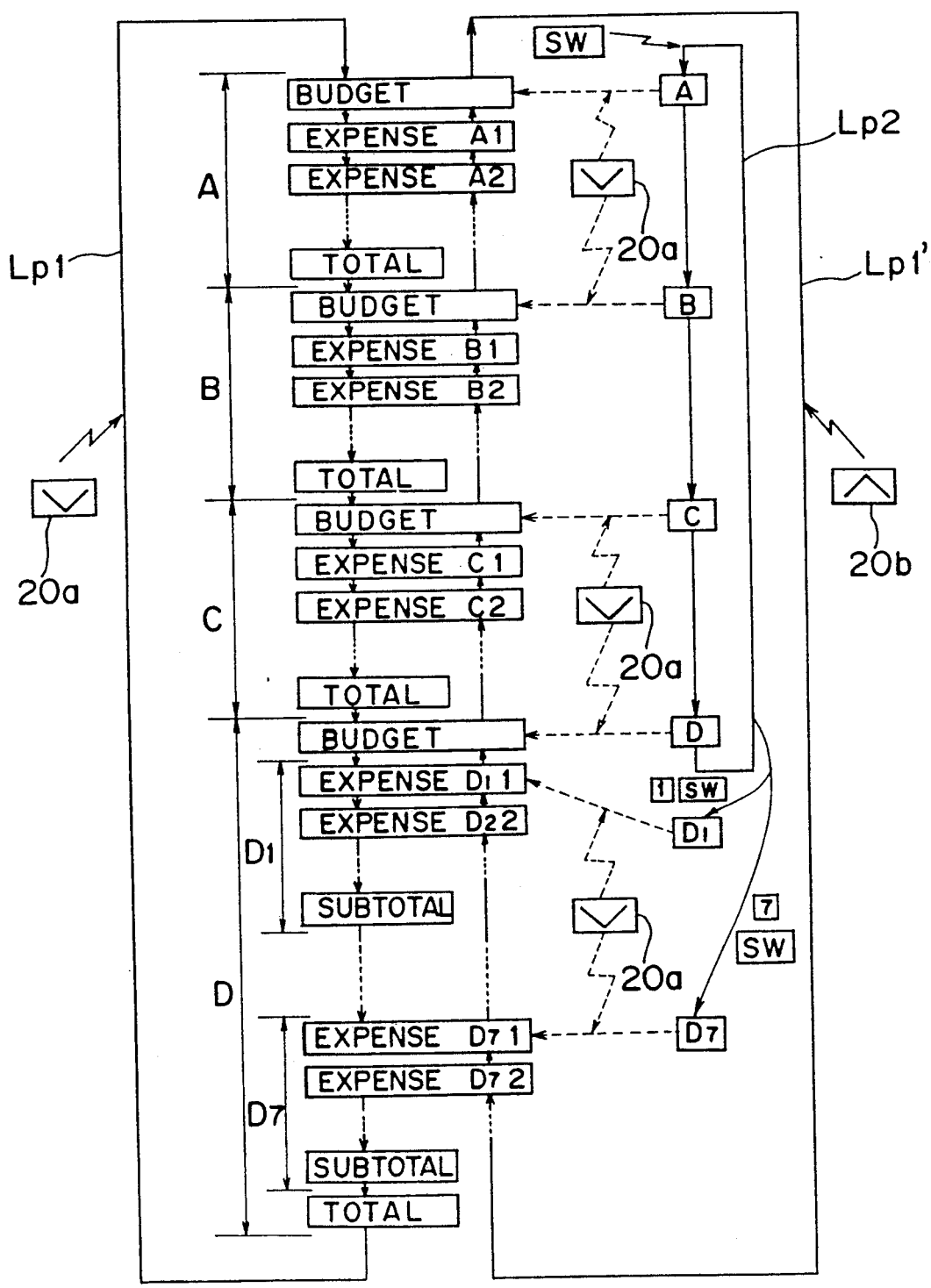
FIG. 4 is a diagram showing the display sequence using a SCAN key or a SW key.

The arrows shown in FIG. 3a indicate the order of segments that are displayed upon the depression of the down SCAN key 20a. For example, starting from the segment Mb that is stored with the item A budget, when the down SCAN key 20a is depressed once, it is programmed to search and display the segment that is stored with the first expense for item A, and then, by the next key depression, the segment stored with the second expense for item A is displayed. When all of the segments that are stored with expenses for item A are searched, the device is so programmed to calculate, $$\Sigma Ai \ (i=1, 2, 3, \ldots )$$

to find the total expense amount for item A, and the result is also displayed. Then, by the further depression of the down SCAN key 20a, item B budget and the expenses in item B are sequentially searched and displayed, and thereafter, a sum of the expenses for item B is displayed. It is to be noted that when the up SCAN key 20b is depressed repeatedly, the total obtaining operation will not be carried out, as shown in FIG. 4

Figure 3B:
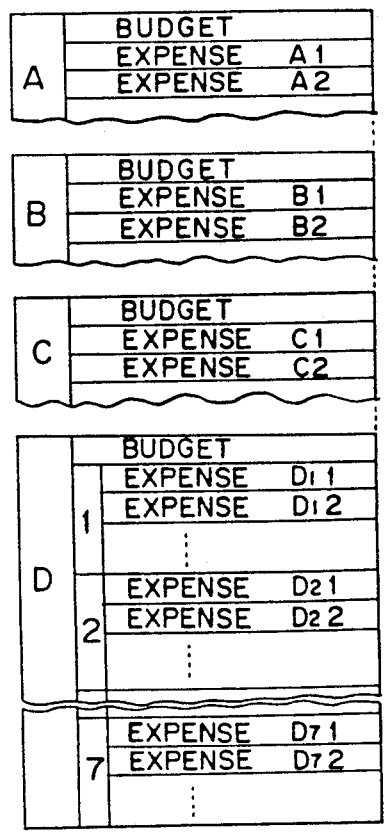

Since segments Me are not previously divided for the different items, it is possible to use all the segments Me for a single item. Continuous or repeated depression of the SCAN key will result in the sequential display of the budget and expenses by the input order in a manner shown in FIG. 4. Thus, the budgets and the expenses are stored in RAM2 as shown in FIG. 3b.

Next, the programs for effecting the searching and summing will be described in connection with FIGS. 5a and 5b.

SEARCHING OPERATION

Referring to FIG. 5a, a flow chart of the searching operation is shown. It is assumed that the display 4 is now displaying the data of a segment with address 6, i.e., the expense B1 is displayed and, at the same time, the pointer points to the box P3, and the down SCAN key is depressed. At step #1, a register G is stored with an item name of the item presently being displayed. Thus, in this assumption, register G carries the item B.

After the depression of the down SCAN key (step #2), register AD is stored with an address of the next segment (step #3). Thus, in this case address 7 is stored in register AD. Then, at step #4, the data (item name and expense amount) in the segment of address 7 is stored in a register DA. Then, at step #5, it is detected whether or not the item name as stored in register DA is identical with the item name stored in register G. If the item names are the same, the program goes to step #11 to move the data in register DA to register X, and at step #12, the data in register X is displayed through display 4. If the item names are not the same, the program goes to step #6 to detect whether or not the address number is the last address number N. If the address number is not equal to the last address number, "1" is added to the contents of the register AD (step #7) and, thereafter, the program goes to step #4 to repeat the same steps.

Since register AD is now carrying address 13, the contents of register AD is increased to 8. Thereafter, the procedure is repeated through steps #4, #5, #6 and #7 until the contents of AD increases to "16" designating the segment carrying item B. When the register AD carries "16", the program advances from step #5 to step #11 and to step #12 for effecting the display of the second expense B2 and, at the same time, the pointer points to the box P5. Then, the device waits until the next depression of the SCAN key.

Returning back to step #6, if the address number is equal to the last address number, a total subroutine (FIG. 5b) is carried out to calculate the total of the expenses in the item now being opened, i.e., item B. Then, at step #9, the next item, in this case item C, is designated. Then, the program returns to step #1, so that the designated item, i.e., C, is stored in register G, and it is the device waits until the next SCAN key depression.

Steps #22-#28 are substantially the same as steps #4-#10.

It is again assumed that the display 4 is displaying the data of a segment with address 6, but at this time, the up SCAN key is depressed. Thus, the program goes to step #13 and further to step #14 so that register AD is stored with address 5. Since the data in address 5 is not of item B, the program goes through steps #15 and #16 to step #17. At step #17, a determination is made on whether or not the contents of AD is equal to 1 for representing the first segment. Since, at this time, the contents of AD is not equal to 1, the program goes to step #18 to subtract "1" from the content of AD, and an address of "4"results. Thereafter steps #15, #16, #17 and #18 are repeated until the segment with the item equal to the item carried in register G, i.e., item B, is detected. Since address "2" is carrying the budget of item B, the program follows the steps of #15, #16, #11 and #12 until AD is reduced to "2". Then, when AD carries "2", the program goes through steps #15, #16 #11 and #12 to display the budget of item B.

Thereafter, if the up SCAN key is depressed for the second time, the program advances through steps #21, #29 and #30 to step #31, so that AD carries "1". Then, the program goes through steps #32 and #33 to step #30. Since AD is carrying "1", the program goes to step #34 so that the preceding item, in this case item A, is designated, and at step #35, the designated item is stored in register G. Then, at step #31, the contents in AD are subtracted by "1". Since the address number is designed to circulate, AD now carries the last address number N. Then, the program goes through steps #32 and #33 and thereafter, steps #30, #31, #32 and #33 are repeated to find the latest segment of item A, and the content of that segment is displayed by the operation of steps #11 and #12.

TOTAL OBTAINING OPERATION

Figure 5B:
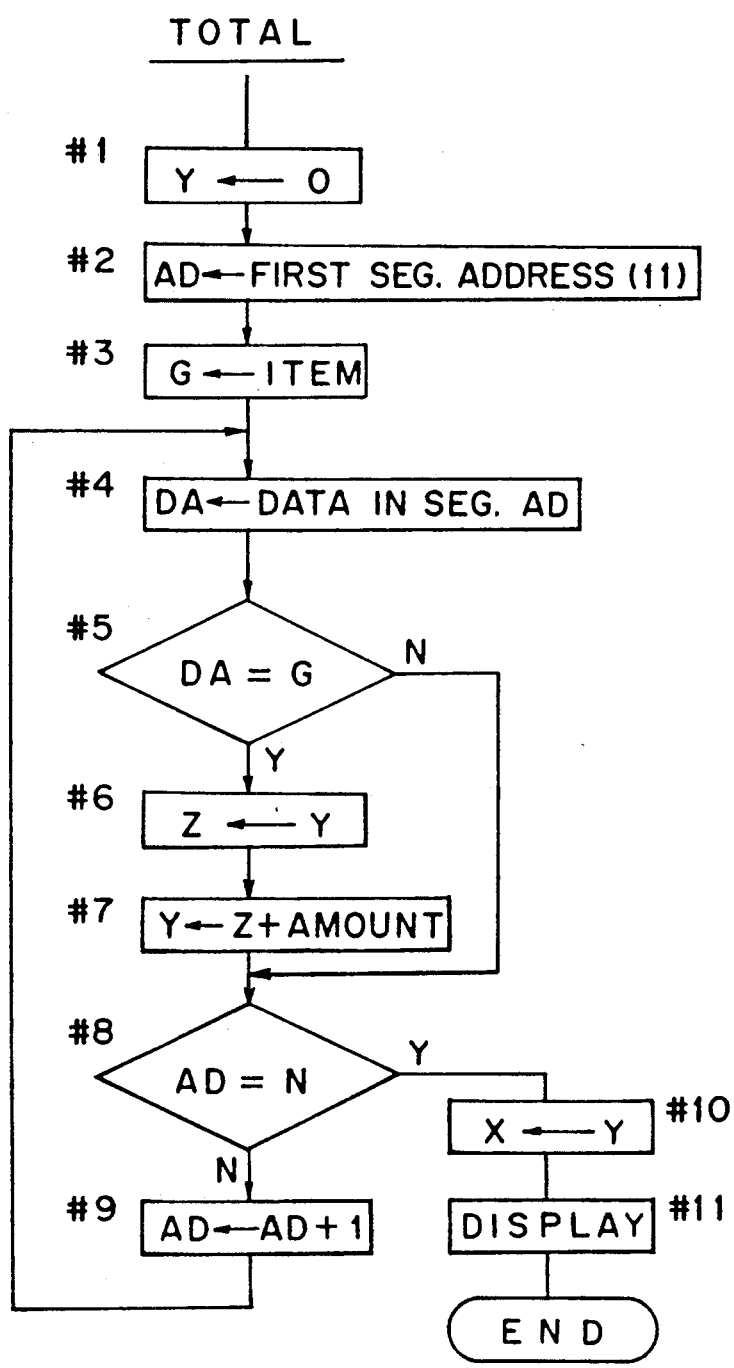
FIG. 5b is a flow chart showing the total obtaining operation.

Referring to FIG. 5b, a flow chart of the total obtaining operation is shown. It is assumed that the display 4 is now displaying the data of a segment with address 6 in the same manner described above. At step #1, "0" is stored in register Y. Then, at step #2, the first segment address for the expenses, in this case 5, is stored in register AD, and at step #3, the present item name, in this case B, is stored in register G. At step #4, the data in the segment with address 5 is stored in register DA, and at step #5, a determination is made on whether or not the item name (B) as stored in register G is identical to the item name stored in register DA, now carrying item name A. Since they are not the same, the program jumps to step #8, and a determination is made on whether or not the address number in AD is equal to the last address number. Since AD is not carrying the last address number, the program goes to step #9 to increment the contents of register AD by "1", thus, AD now carries "6". Then, again at step #4, the data in the segment with address 6 is stored in register AD, and at step #5, a determination on whether the item name (B) as stored in register G is identical to the item name stored in register DA. Thus, the program goes to step #6 to move the contents of register Y in register Z and, at step #7, the contents of Z is added with the expense amount stored in register DA, in this case B1, and the sum thereof is stored in register Y. Since register Y is originally carrying "0", register Y now carries B1. By repeating the steps #4–#9, the expenses in the designated item, in this case item B, are added up in register Y. When the segment with the last address number is investigated through steps #4–#7, the program advances from step #8 to step #10 and further to step #11 to display the total of the expenses in item B.

Next, the operations of the electronic account record keeping device will be described.

QUICK ACCESS OPERATION

SW key 8 enables a quick access to a required item. Referring to FIG. 6, when the mode key 6 is switched to the memory position, the display 4 shows "A" and brackets indicating that the device is ready to enter item A into the recording area. Then, when SW key 8 is depressed, the display 4 shows "b" and brackets indicating that the device is ready to enter item B into the recording area. By depressing the SW key, items A, B, C and D are changed in a manner shown by a loop Lp2 in FIG. 4. If a number, such as "1", and the SW key are depressed sequentially, the recording area of subitem D is changed.

For example, if it is required to have access to item B, the SW key is depressed until the display device displays "b". Then, by the first depression of the down SCAN key 20a, the scrolling escapes from loop Lp2 and enters the loop Lp1. Thus, the first memory segment, which is stored with a budget of the requested item B, is accessed and is displayed on the display device. A further depression of the down scan key 20a will result in the scrolling of the loop Lp1.

In another example, if it is required to have access to subitem D7, no matter which item is accessed a number key "7" is depressed and then, SW key 8 is depressed. Then, the first depression of the down scan key 20a will lead to the first memory segment in subitem D7 in which the first expense account in subitem D7 is stored. It is to be noted that the budget for item D will cover all the subitems D1-D7.

DISPLAY SCROLLING OPERATION

The display is scrolled up and down using SCAN keys 20a and 20b, so as to enable the user to review the recorded budget and recorded expenses through items A, B, C and D, in a manner indicated by loops Lp1 and Lp1', shown in FIG. 4. Examples of the display effected by the SCAN keys are shown in FIG. 7. As can be understood from the flow chart shown in FIG. 5a, when the downward scrolling is effected by down SCAN key 20a through loop Lp1, the total of the expenses is displayed before entering the next item. However, when the upward scrolling is effected by up SCAN key 20b through loop Lp1', such a total is not displayed. In the case where no data, not even the budget, is recorded in the item, only one display including the item name and brackets will be displayed.

BUDGET INPUT OPERATION

Figures 8D, 8E:
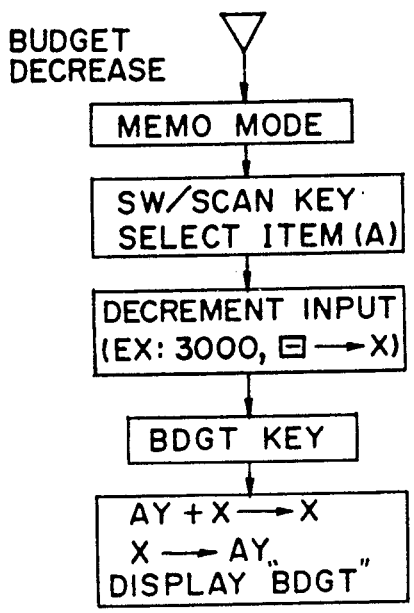

The budget input operation is shown in FIGS. 8a-8g. For the budget setting operation, the steps are shown in FIGS. 8a and 8b. First the memory mode is selected by switching mode key 6 to the memory position. Then, the item needed to input the budget, e.g., item A, is selected by using the SW key and/or the SCAN key. Thereafter, the budget amount, e.g., 25,000, is inputted by using the number keys 2 and is stored in register X. Then, by the depression of BDGT key, the contents "25,000" in register X are moved to register AY thereby entering the budget and, at the same time, "BDGT" is displayed so as to indicate the budget input.

For the budget increase operation, the steps are shown in FIGS. 8a and 8c. First the memory mode is selected and the item, such as item A, that is needed to increase the budget is opened. Then, the increment amount, such as 5000, is inputted through the number keys 2 and is stored in register X. Then, upon depression of the BDGT key, the contents of register AY, which is assumed to be 25,000, is added with the contents of register X, and the sum thereof is stored in register X. Furthermore, the contents of register X, which is now 30,000, is moved to register AY. Also, "BDGT" is displayed so as to indicate the budget input.

For the budget decrease operation, the steps are shown in FIGS. 8a and 8d. After selecting the memory mode and the item in the same manner as described above, the decrement amount, such as "3000", is inputted by the number keys, including the subtraction key, 2 and is stored in register X. Then, upon depression of the BDGT key, the contents of register AY, which is assumed to be 30,000, is subtracted by the contents of register X, and the difference thereof is stored in register X. Furthermore, the contents of register X, which is now 27,000, is moved to register AY. Also, "BDGT" is displayed so as to indicate the budget input.

Figure 8F:
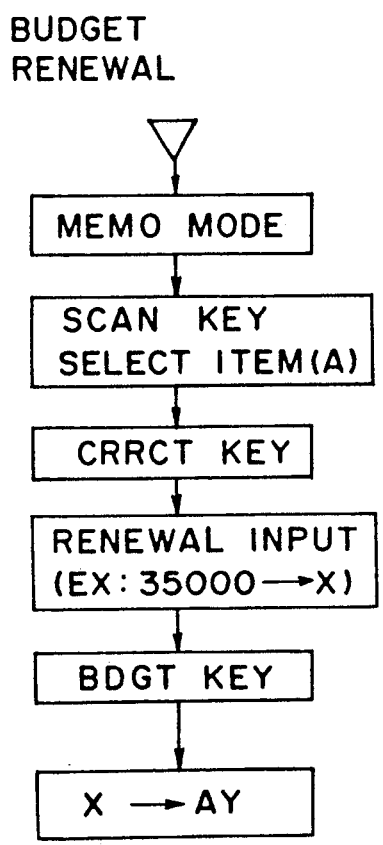
FIGS. 8f and 8g are flow charts showing operations for renewing and for clearing the budget, respectively.

For the budget renewal operation, the steps are shown in FIGS. 8e and 8f. When the memory mode is selected and the item to be corrected is selected in the same manner as above, the display shows the budget amount, such as "27,000", which has been previously stored in register AY. Then, CRRCT key 18 is depressed, which results in the indication of "CRRCT".

Thereafter, the renewal amount, such as 35,000, is inputted through the number keys 2 and is stored in register X. Then, by the depression of the BDGT key, the contents of the register X is moved to register AY and also, "BDGT" is displayed so as to indicate the budget input.

Figure 8G:
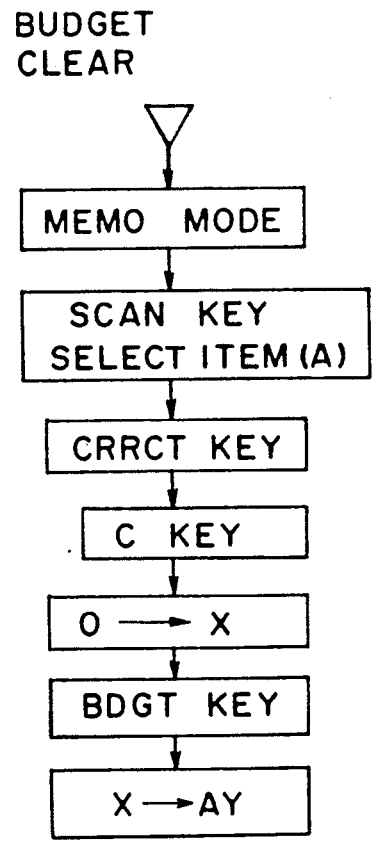

Finally, for clearing the budget, the steps are shown in FIGS. 8e and 8g. After selecting the memory mode and the item in the same manner as described above, the display shows the budget amount, such as 35,000. Then, the CRRCT key is depressed, resulting in the indication of "CRRCT". Thereafter, a C key, which is the clear key, is depressed to store "0" in register X. Then, upon depression of the BDGT key, the contents of register X is moved to register AY and also, "BDGT" is displayed so as to indicate the budget input.

EXPENSE INPUT OPERATION

Figure 9B:
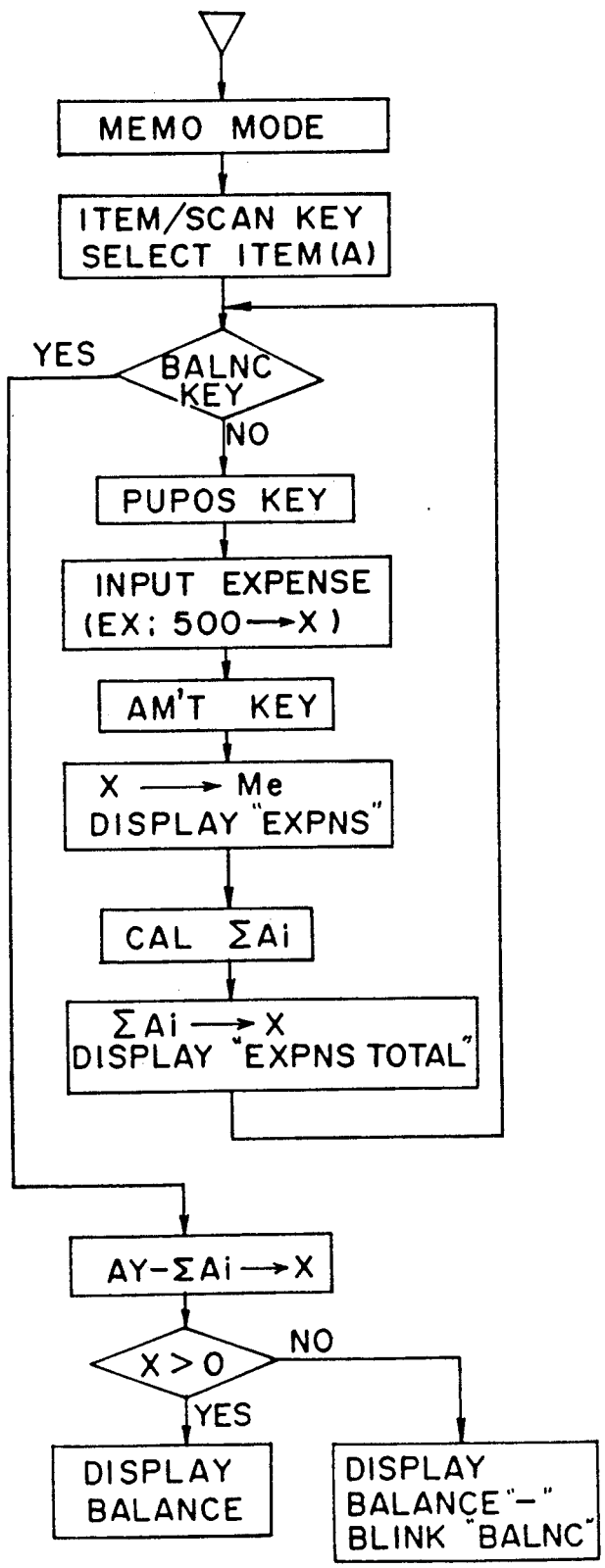

The expense input operation is shown in FIGS. 9a and 9b. First, the memory mode is selected and the item, such as item A, that is needed to input the expense is opened. It is then determined whether or not the BALNC key is depressed. Here, it is assumed that the BALNC key is not depressed. Thereafter, the PUPOS key is depressed for a number of times, to indicate to expense purpose by shifting the pointer. The PUPOS key can be depressed after the input of the expense amount and before the depression of the AM'T key. Then, the expense amount, such as 500, is inputted through the number keys 2 and stored in register X. Thereafter, upon depression of the AM'T key, the contents of register X is shifted to memory Me and, at the same time, "EXPNS" is displayed, thereby entering the expense amount. The operation further continues to automatically calculate the total of all the expenses in the opened item A (FIG. 5b), and the result is displayed with an indication of "EXPNS TOTAL".

As apparent from the forgoing description, when the AM'T key is depressed, the expense amounts which have been recorded in the item being opened are automatically summed and displayed. More specifically, when the AM'T key is depressed, the inputted expense amount is displayed through the display device together with the guide mark "EXPNS" for about 1-2 seconds. Thereafter, the expense amounts in the item being opened are automatically summed and the result is displayed through the display device.

If it is assumed that the BALNC key is depressed, the total of the opened item is subtracted by the item budget, and the difference is stored in register X. If the difference is positive (greater than zero), the difference is displayed with the indication of "BALNC". On the contrary, if the difference is negative (less than zero), the difference is displayed with a (−) sign and a blinking sign of "BALNC".

As apparent from above, BALNC key 14 is provided for showing the operator the remaining balance. When the BALNC key is depressed from any place within loop Lpl or Lpl', the expense amounts in the item being opened are automatically summed and the result is subtracted from the item budget. The remainder, which is the balance, is then displayed.

As will be described in detail later in connection with FIGS. 12a-12d, BALNC key 14 is also provided for effecting the compression for saving storing areas in a memory unit for recording further expense accounts.

Figure 9D:
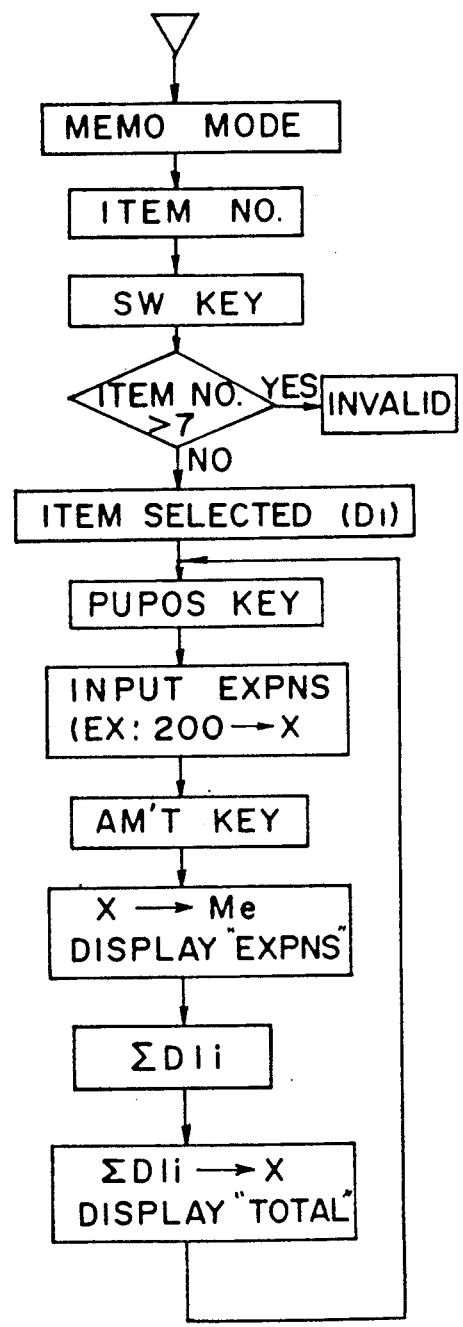
FIG. 9d is a flow chart showing the operation for the steps shown in FIG. 9d.

Referring to FIGS. 9c and 9d, another example of the expense input operation, which operation is for inputting an expense, is shown for item D1. First, the memory mode is selected and the item number, such as 1, is inputted. Then, the SW key is depressed. A determination is made on whether or not the item number is greater than seven. If the item number is greater than seven the key input is determined to be invalid since there is no item greater than seven. If the item number is less than seven the item is determined to be properly selected. Then, the PUPOS key is depressed to indicate the expense purpose by shifting the pointer, and the expense amount, such as 200, is inputted through the number keys 2 and is stored in register X. Thereafter, upon depression of the AM'T key, the contents of register X is shifted to memory Me and, at the same time, "EXPNS" is displayed, thereby effecting the expense input. The operation further continues to automatically calculate the total of all the expenses in the opened item D1 (FIG. 5b), and the result is displayed with an indication of "EXPNS TOTAL".

EXPENSE CORRECTION OPERATION

Figures 10A, 10B:
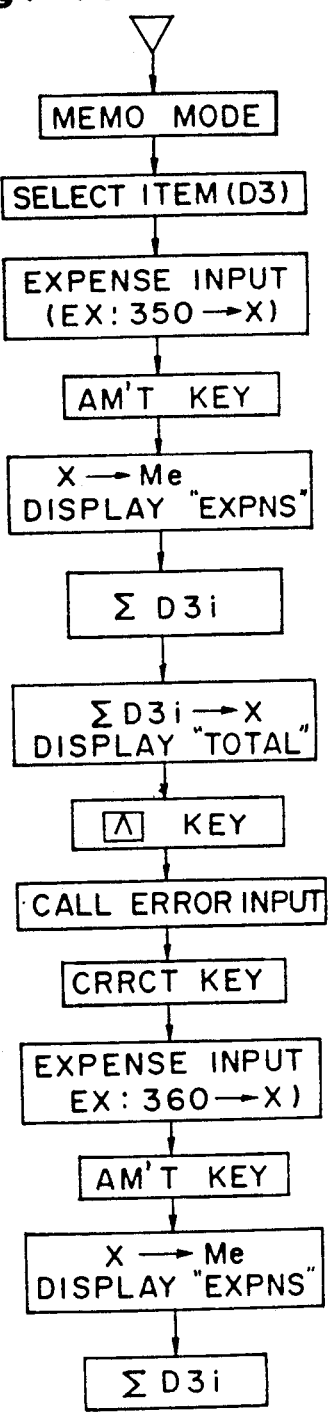

The expense correction operation is shown in FIGS. 10a, 10b and 11. For correcting the amount of the input expense, the steps are shown in FIGS. 10a and 10b. First the memory mode is selected and the item, such as item D3, is selected in the same manner as described above. Then, the expense 350 is inputted according to the steps described above. It is assumed that the expense 350 should be corrected to 360. For this result, the memory segment carrying the expense 350 is called on the display by using the up/down SCAN key. Next the CRRCT key is depressed, resulting in the indication of "CRRCT". Then, the correct expense amount 360 is inputted by the number keys to store the amount 360 in register X. Thereafter, upon depression of the AM'T key, the contents of register X is shifted and stored in memory Me in place of 350, thereby entering the correct expense amount. Thereafter, the total in the item D3 is calculated.

For correcting the pointer position, the steps are shown in FIG. 11. First, the memory segment carrying the wrong pointer position is called on the display by using the up/down SCAN key. Then, the CRRCT key is depressed, resulting in the indication of "CRRCT". Then, the pointer position is changed to a correct position by depressing the PUPOS key for a number of times. When the pointer is moved to the correct position, the correct pointer position is entered by depressing the AM'T key.

COMPRESSION OPERATION

The compression operation is shown in FIGS. 12a, 12b, 12c and 12d. The compression operation makes empty memory segments by the steps of: adding the expenses in one item from the first expense to the object expense; storing the added result in the segment where the first expense has been stored; emptying other segments having the expenses which have been added; and shifting the empty segments towards the bottom for inputting the further expenses. The compression operation is useful when all the memory segments are used. As shown in FIG. 12b and FIG. 12d left column, when the last segment is filled, for example with the expense amount of 250 for item D5, the guide mark "EXPNS" blinks to show that there are no more segments left to input the expense. In other words, the memory area in RAM2 for the expense storing is filled. Under this condition, a further expense input is prohibited. To enable a further expense input, some segments must be emptied. To this end, the compression operation is effected. Here, it is assumed that the segments with the first and second expenses for item D5 (address numbers N-7 and N-4) are compressed. In this case, the second expense is the object expense.

As shown in FIGS. 12a and 12c, item D5 is selected and by using up/down SCAN keys, the segment with the object expense is searched. Then, the CRRCT key and the BALNC key are depressed sequentially. Thereupon, the amount as stored in the segment MD51 of the first expense in the item D5 and the amount as stored in the segment MD52 of the second expense are added with each other and the sum thereof are stored in the segment MD51. At the same time, the contents of the segment MD51 is also applied to the register X for the display of the sum. Then, the segment MD52 is emptied and, the data stored in the following segments are sequentially shifted to move the empty segment at the end of the segments stored with data. In this case, only one segment with the address N is emitted. The result is shown in FIG. 12d, right column.

When the shifting operation is completed, the "EXPNS" is displayed without blinking. Thereafter, the total of the expenses in the item being opened are automatically carried out and the result thereof is displayed. The compression operation can be used even before the segments are filled with the expense data.

EXPENSE DATA CANCELLATION

Figures 13A, 13B:
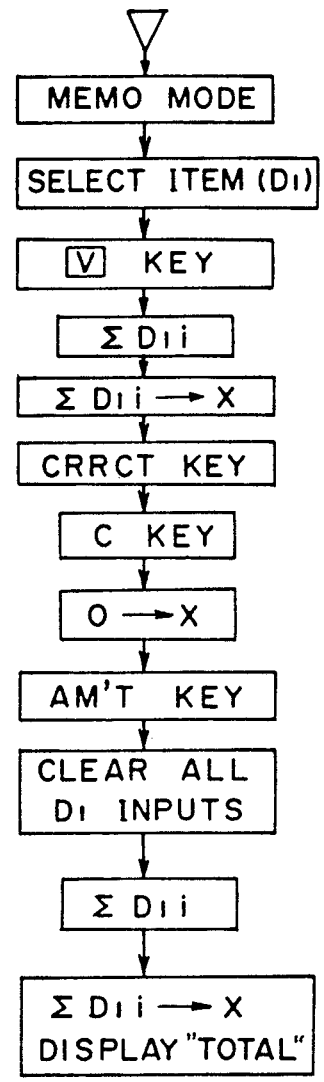

Referring to FIGS. 13a and 13b, the steps to cancel all the expenses in one item are shown. First, the memory mode is selected by the mode key 6, and the item, e.g., item D1 is selected. Then, by using the down SCAN key, the subtotal of the expenses in item D1 is obtained and is stored in the register X, in a manner shown in FIG. 4. Then, the CRRCT key is depressed to set the correct mode and next, the clear key C is depressed to store "0" in the register X. Sequentially, the AM'T key is depressed so that the contents "0" of the register X is transferred to each one of the segments that are stored with expenses in the item D1, whereby these segments are emptied. Then, the total is calculated, and the result, "0" is displayed. The emptied segments are sequentially shifted down.

FIG. 13b also shows the steps to cancel all the expenses in item D including subitems D1-D7.

Referring to FIG. 14, the steps to cancel one expense in one item are shown. First, the memory mode is selected and the item, e.g., item D5, is selected. Then, by using the down SCAN key, the expense to be cancelled is displayed. Then, the CRRCT key is depressed to set the correct mode, next, the clear key C is depressed to store "0" in the register X. Sequentially, the AM'T key is depressed so that the contents "0" of the register X is transferred to the segment now being displayed, whereby that segment is emptied. Then, the total is calculated, and the result is displayed. The emptied segment is sequentially shifted down.

Overflow Estimation

Figure 15B:
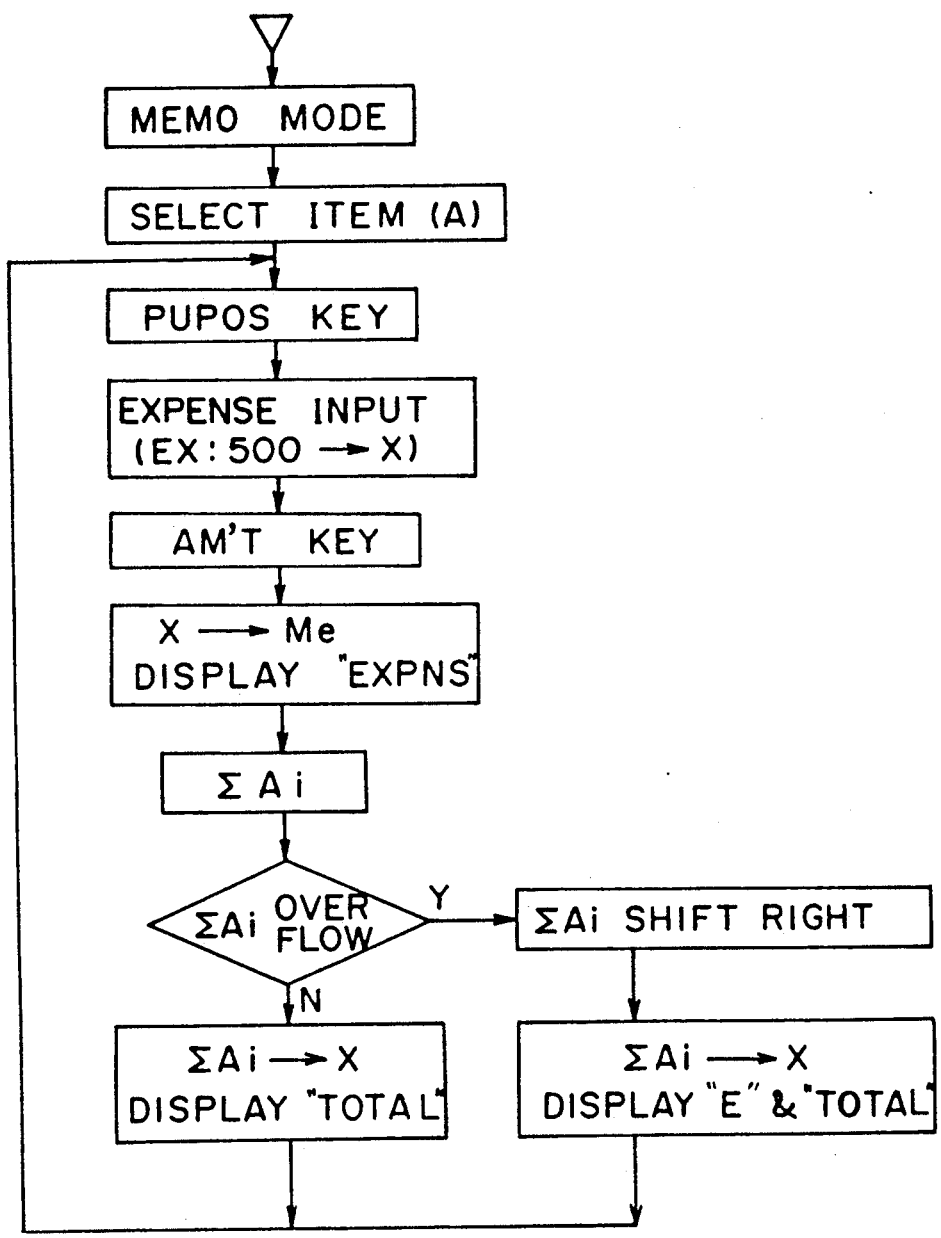

Referring to FIGS. 15a and 15b, the steps to calculate, when an overflow of the digit place takes place, an estimated total amount are shown. When adding the expenses, a case may occur where the added result exceeds the maximum available digit places, such as eight digit places. In such a case, the displayed number is shifted one digit place to the right, so that the lowest digit place represents the tens ($10^1$) and the highest digit place represents the one hundred millions ($10^8$). The shifting of the digit place is indicated by a dot inserted between the two leftmost digit places.

According to the example shown in FIGS. 15a and 15b, an expense 700 is added to the total of 99,999,400. In this case the result is 100,000,100. When the overflow is detected, the result is shifted one digit place to the right, and the result is displayed as 1.0000010 with "E" indicating the error. The error condition can be cleared by depressing the clear key C or by depressing the SCAN key.

CALCULATION OPERATION

Referring to FIG. 16, even when mode key 6 is switched to the memory position, it is possible to carry out a calculation of addition, subtraction, multiplication and division. This is useful when calculating the return ticket fee, as shown in FIG. 16, in which the one way ticket fee 130 is multiplied by two and the result 260 is inputted by the depression of the AM'T key.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. An electronic account recording device for storing a plurality of expense amounts which can include different types of expenses, corresponding to a plurality of item names comprising:
   a casing;
   a key board on said casing including,
   number keys for inputting numbers,
   a switch key for selecting an item name from said plurality of item names corresponding to a number inputted,
   an amount key for inputting in first memory means a plurality of expense amounts corresponding to the item names selected;
   the first memory means being divided into a plurality of memory segments, each of said plurality of memory segments storing one of said plurality of expense amounts and one of said plurality of item names;
   scan key means for sequentially scanning the plurality of expense amounts stored in said first memory means;
   display means for displaying one of said plurality of item names, numbers and said expense amounts in response to inputs of said number keys and said amount key, and sequentially displaying in response to actuation of said scan key means;
   control means for operation in response to an actuation of said scan key means, for sequentially scanning for displaying on said display means said plurality of expense amounts corresponding to one of said plurality of item names; and said control means further operating in response to actuation of said scan key means for sequentially scanning and for displaying on said display means expense amounts corresponding to another of said plurality of items; means operatively connected with said scan key means for displaying on the display means said expense amounts corresponding to said one and another items in sequence; and compression key means for operating said control means such that said plurality of expense amounts for said one of said plurality of item names are summed and stored in a single memory segment of said plurality of memory segments and each of said plurality of memory segments having said plurality of expense amounts corresponding to said one item name are emptied, so as to provide corresponding vacant memory segments in said first memory means.

2. An electronic account recording device as claimed in claim 1, wherein said scan key means comprises an up scan key and a down scan key, said down scan key actuating said control means for scanning the expense amounts of one of said plurality of item names sequentially in the order inputted into said first memory means, and said up scan key actuating said control means for scanning the expense amounts of one of said plurality of item names sequentially in the order opposite to the order inputted into said first memory means.

3. An electronic account recording device as claimed in claim 2, wherein said control means operates in response to the actuation of said down scan key for calculating a total of the expense amounts of one of said plurality of item names after displaying all the expense amounts in said one item name, and displaying said total.

4. An electronic account recording device as claimed in claim 1, wherein said control means operates in response to the actuation of said amount key for calculating a total of the expense amounts of one of said plurality of item names corresponding to said one item name of the expense amount, and displaying the total thereafter.

5. An electronic account recording device as claimed in claim 1, further comprising a budget key for entering a budget for said plurality of item names, said budget being stored in said second memory means.

6. An electronic account recording device as claimed in claim 5, further comprising a balance key for operating said control means such that a balance is calcualted between said budget for one of said plurality of item names and a total of the expense amounts in one of said plurality of item names, and displaying said balance.

7. An electronic account recording device as claimed in claim 6, wherein said control means further produces a warning when said balance becomes a negative amount.

8. An electronic account recording device as claimed in claim 1, further comprising a purpose key for selecting a purpose of the expense amount from a plurality of predetermined purposes, said purpose being stored in same first memory means corresponding to said expense amount.

9. An electronic account recording device as claimed in claim 1, wherein said control means produces a warning when all of said plurality of memory segments are filled.

10. An electronic account recording device as claimed in claim 1, wherein said display means has a window for disp aying a display number having digit places less than or equal to a predetermined number.

11. An electronic account recording device as claimed in claim 10, wherein said control means produces an estimated amount when said display number has digit places greater than said predetermined number.

12. A method for storing a plurality of expense amounts which can include difference types of expenses corresponding to a plurality of item names in an electronic accounting recording device, comprising the steps of:
(a) inputting numbers utilizing number keys on a keyboard of said electronic account recording device;
(b) selecting an item name from said plurality of item names to be inputted corresponding with said numbers by a switch key;
(c) storing an expense amount in first memory means using amount key that corresponds to said numbers and said item name inputted;
(d) sequentially scanning a plurality of expense amounts stored in said first memory means by using scan key means which corresponds to one of the item names;
(e) displaying on a display means one of said plurality of item names and said expense amounts corresponding to said one item name with the actuation of scan key means;
(f) displaying on the display in sequence to step (e) another of said plurality of items names and expense amounts corresponding to said another item name upon actuation of the scan key means; and
(g) operating a control means for summing a plurality of expense amounts associated with an item name for compressing the expense amounts in a portion of a memory means to provide another portion of the memory means as a vacant portion which can receive further expenses associated with an item name.

* * * * *